July 2, 1929.    M. G. ROSS    1,719,784
GRINDING MACHINE
Filed Feb. 26, 1926    2 Sheets-Sheet 2
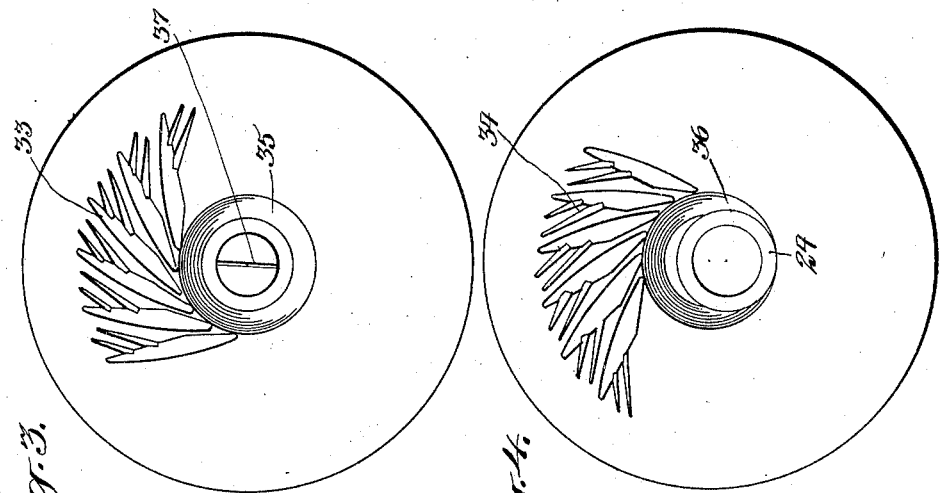
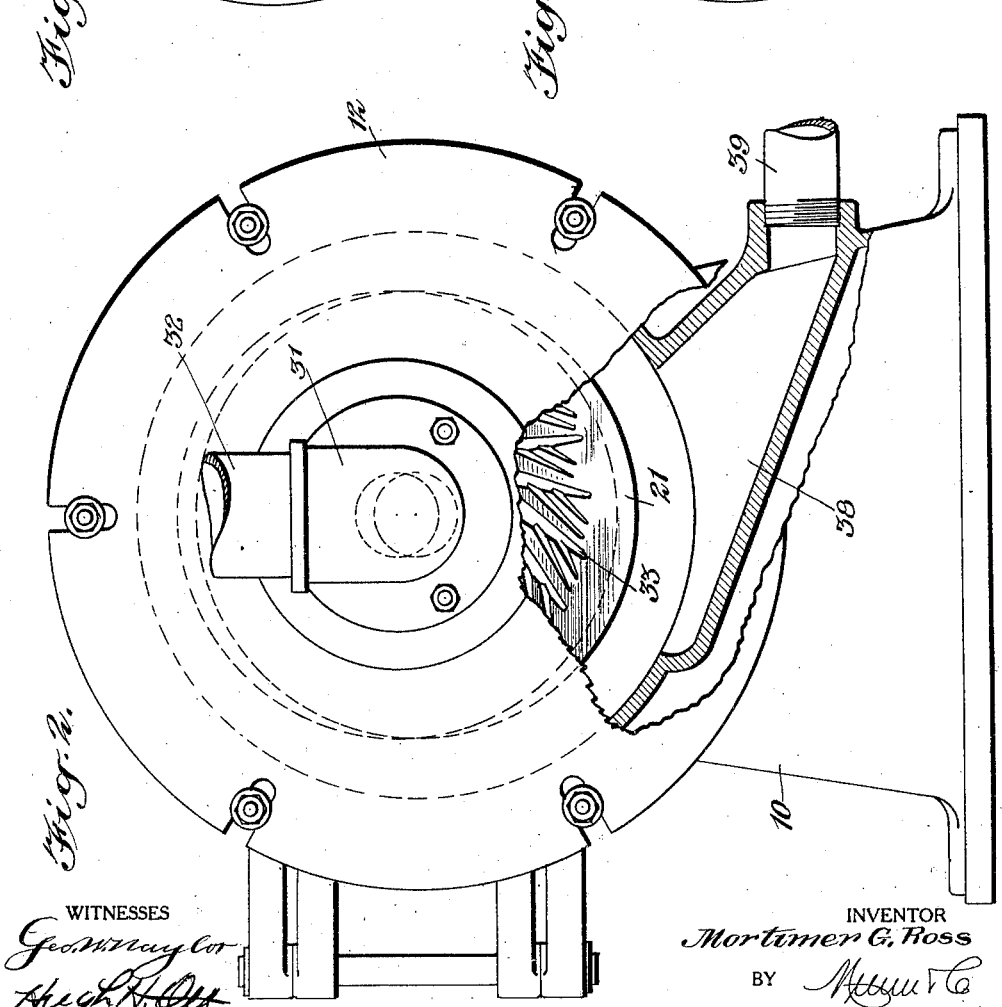
WITNESSES
INVENTOR
Mortimer G. Ross
BY
ATTORNEYS Patented July 2, 1929.

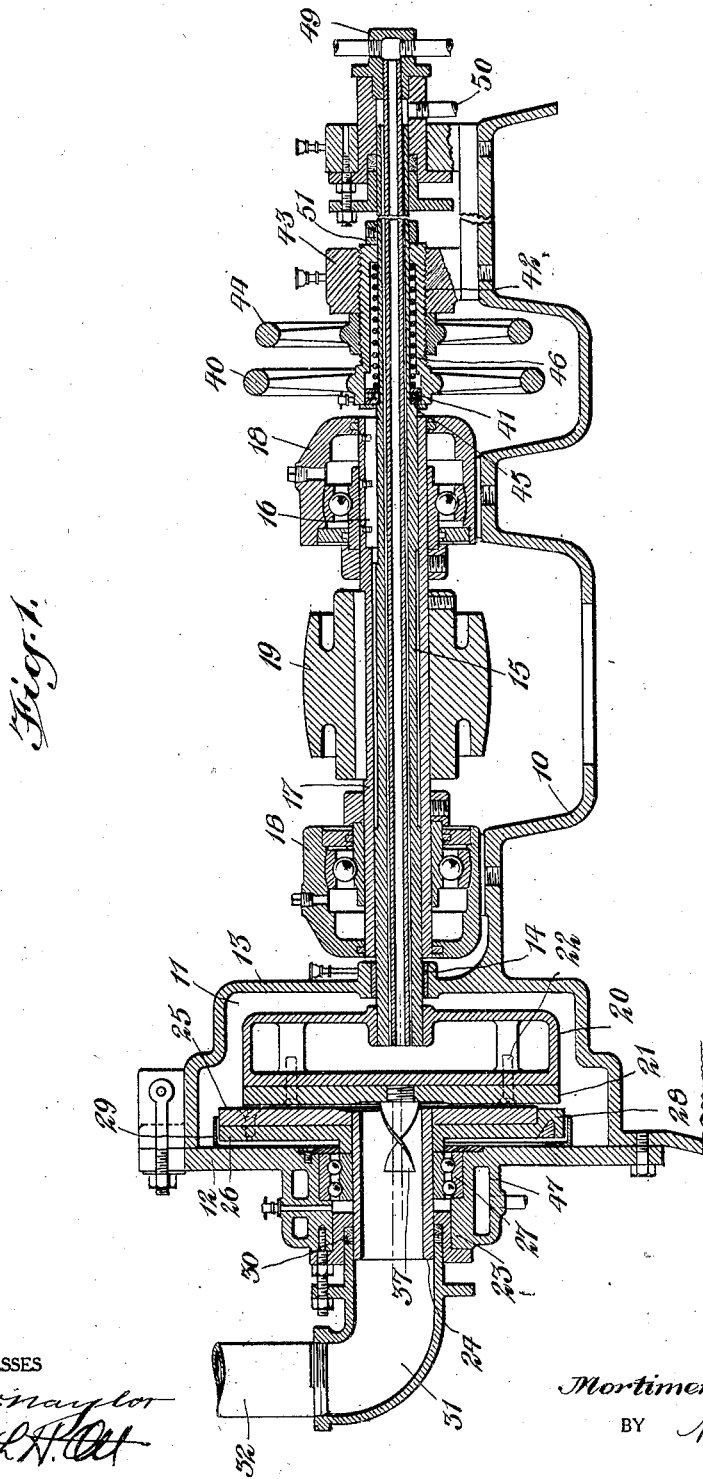

1,719,784

UNITED STATES PATENT OFFICE.

MORTIMER G. ROSS, OF BROOKLYN, NEW YORK.

GRINDING MACHINE.

Application filed February 26, 1926. Serial No. 90,891.

This invention relates to grinding machines or mills and has particular reference to a machine or mill for grinding, rubbing and reducing materials of a liquid, semi-liquid or semi-paste form.

One of the outstanding and principal objects of the invention resides in the provision of a machine or mill of this class which functions to more rapidly, thoroughly and efficiently reduce the materials fed therethrough by virtue of the setting up of an epicycloidal grinding action which imparts a peculiar mulling, rubbing or rolling, tending to more rapidly and thoroughly reduce the material.

More specifically the invention comprehends a machine or mill which is preferably, although not necessarily, of the horizontal type including a pair of grinding plates, the confronting faces of which are scored, grooved, furrowed, serrated, or otherwise formed according to the material being treated, one of which plates is positively driven on a concentric axis and the other of which is freely mounted eccentric to its own axis and eccentric to the axis of the driving plate to be driven by the friction of the material fed between the confronting faces of the plates.

The invention furthermore comprehends by reason of the high speed at which the machine is operated and the friction caused by the frictional driving contact, a cooling means for the plates.

The invention aims as a further object to provide means for effecting relative adjustment of the plates to afford the amount of pressure applied to the material between the fronting faces for regulating the degree of fineness to which the material is to be ground.

As a still further object the invention contemplates a grinding machine or mill of the character set forth which is comparatively simple in its construction and mode of operation, inexpensive to manufacture, install and operate; which facilitates the repair or replacement of broken, mutilated or worn parts, and which is highly efficient in its purpose.

With the above recited and other objects in view, reference is had to the following specification and accompanying drawings in which there is exhibited one example or embodiment of the invention which is in no way intended as a limitation upon the scope of the appended claims as it is to be clearly understood that variations and modifications which properly fall within the scope of said claims may be resorted to when found expedient.

In the drawings—

Figure 1 is a fragmentary longitudinal sectional view through the machine;

Fig. 2 is a front end view of the machine with parts broken away and shown in section to disclose the underlying structure;

Fig. 3 is a face view of the driving plate;

Fig. 4 is a similar view of a driven plate.

Referring to the drawings by characters of reference, 10 designates the base of the machine which is formed at one end, which will hereinafter be termed the "forward end", with a hollow substantially cylindrical casing 11, which casing is open at its forward end and is designed to be closed by a closure head 12 hinged to and secured in any suitable manner to the casing 11 to facilitate the opening or closing of the casing. The rear closed wall 13 of the casing is formed with a bearing opening 14, through which the forward end of a driving spindle 15 extends. The driving spindle is splined at 16 to a tubular driving shaft or sleeve 17 which driving shaft or sleeve is mounted in longitudinally spaced bearings 18—18 carried by the base 10. A driving pulley 19 is keyed to the driving sleeve and is operatively connected by a belt to any suitable motive power, for rotating the sleeve and spindle. At the forward end the spindle has secured thereto a hollow carrier member 20, to the front face of which a driving plate 21 is detachably secured by fastening elements, such as screws 22, the driving plate and its carrier being preferably of circular formation and concentrically associated with the spindle for turning movement in the casing 11. The closure head 12 is provided with an annular forwardly projecting boss 23 and a central opening communicating with the boss. The closure head, boss and opening are designed to receive therein the tubular stem 24 of a driven plate 25, which driven plate is attached to a carrier 26 and mounted by means of its stem in a bearing 27 in the boss for turning movement with respect to the closure head. The axis of the stem 24 is disposed eccentric to the axis of the spindle 15 and the stem 24 is in turn disposed eccentric to the periphery of the driven plate 25, which driven plate is also preferably of circular formation. The driven plate carrier 26 is of greater diameter than the driven plate 25 and the stem 24 is disposed concentric to the periphery of said carrier whereby the periphery of the driven plate will be wholly disposed within the confines or the periphery of its carrier. The portion of the driven plate carrier which extends radially beyond the periphery of the driven plate is formed with a marginal portion 28 of increased thickness to cover the marginal or peripheral edge of said driven plate, whereby a substantially true or concentric peripheral surface is provided with which co-operates an annular curve or baffle wall 29 provided on and projecting inwardly from the closure head to constitute a means for deflecting the materials being ground from entrance between the closure head 12 and the carrier member 28. The stem 24 which extends at its inner end into a central opening in the driven plate 25, has its outer end passing through a stuffing box 30 and communicating with a stationary elbow inlet 31 through which the materials to be operated on are fed from a supply conduit or pipe 32. The confronting faces of the driving plate 21 and the driven plate 25 may be scored, grooved, furrowed, or serrated, as partially illustrated at 33 and 34, which scores, grooves, furrows or serrations radiate from the substantially central depressions or recessed portions 35 and 36. In order to assist in the feeding of the materials between the confronting faces of the grinding plates 21 and 25, a feed worm 37 may be secured to the front face of the plate 21 and project forwardly into the stem 24. It is, of course, obvious that the casing 11 is provided with a radial outlet 38, which is preferably disposed at its lower portion to gravitationally assist in the discharge of the materials.

In use and operation, the materials to be ground for the purpose of reducing, grinding or rubbing the same, are fed from the supply pipe 32 through the elbow inlet 31 and through the tubular stem 24 initially to the substantially central recesses 35 and 36, the feed worm 37 assisting in urging the material to such point. The rapidly rotating driving plate secured to the spindle 15 sets up a frictional engagement between the materials and the confronting faces of the plates so that the driven plate 25 is caused to turn with the driving plate. Due to the eccentric mounting of the driven plate stem 24 with respect to the spindle 15 and the eccentric disposition of the driven plate with respect to its own stem, the materials will be subjected to a cycloidal grinding action between the plates, which imparts a peculiar mulling, rubbing or rolling action tending to more rapidly and thoroughly grind, reduce, separate or levigate the materials, while a centrifugal action radially expels the material from the peripheries of the plates to the interior of the casing 11 from whence it is discharged through the outlet 38.

In order to effect relative adjustments of the faces of the plates toward and away from each other whereby to regulate the fineness to which the material is to be ground, an adjusting hand wheel 40 is operatively connected through the medium of a thrust bearing 41 with the spindle 15, the adjusting hand wheel having a threaded stem 42 which threadedly engages a bearing arm 43 and which is held or maintained in adjusted positions by a locking hand wheel 44. It is obvious from this structure that the spindle is axially adjusted through the driving sleeve to which it is splined. If desired, the thrust bearing may frictionally engage the shoulder 45 on the spindle under the tension of a spring 46, which constitutes a safety device to prevent breakage or marring of the faces of the grinding plates in event of the entrance of a solid obstruction being fed therebetween, such as a nail or the like. It is obvious that the spring 46 will be of sufficient tension to maintain the grinding faces under ordinary conditions in properly spaced relation and will only function to permit of separation of the faces in event of the introduction of a foreign solid substance or element being fed between the grinding plates.

Due to the high speed with which the machine is operated and the friction caused from the contact of the plates with the material, the present invention comprehends a cooling system, which consists in providing a water or cooling fluid jacket 47 around the annular boss 23 and the provision of a water or cooling medium supply pipe 48 extending through the spindle 15 to communicate with the interior of the hollow carrier member 20 at its forward end and to communicate with a supply head 49 at its rear end, the said supply pipe being concentrically spaced within the spindle which is hollow or tubular, so that the water or cooling fluid may circulate and return from within the hollow driving plate carrier member 20 to an outlet 50.

In order to permit the withdrawal of the driving plate 21, its carrier 20 and tubular spindle 15 from the casing and driving sleeve for washing and cleansing both the plate and the inside of the casing, the lock collar 51 in rear of the thrust bearing assemblage 41 is loosened.

The term grinding plate or plates is intended to cover plates or disks of metal, stone, or other equivalent medium.

What is claimed is:

1. In a grinding machine or mill, including a pair of grinding plates mounted in confronting relation, one of said plates being mounted eccentric to the other and eccentric to its own mounting.

2. In a grinding machine or mill, including a pair of grinding plates between which the material to be ground is fed, one of which plates is positively driven and the other of which is mounted in confronting relation for driving by the friction of the material between the confronting faces of the plates; means for mounting said plates on axes eccentric to each other, the frictionally driven plate being mounted eccentric to its own axial mounting.

3. A grinding mill, including a positively driven rotary driving plate, a driven plate having a mounting eccentric to its own axis and in which the mounting therefor is eccentric to the axis of the driving plate, said driven plate being driven by the frictional contact of the material being ground between the confronting faces of the plates.

4. A grinding mill, including a positively driven rotary driving plate, a driven plate having a mounting eccentric to its own axis and in which the mounting therefor is eccentric to the axis of the driving plate, said driven plate being driven by the frictional contact of the material being ground between the confronting faces of the plates, and means for varying the spacing between the plates to regulate the fineness of the grinding action.

5. A grinding mill, including a positively driven rotary driving plate, a driven plate having a mounting eccentric to its own axis and in which the mounting therefor is eccentric to the axis of the driving plate, said driven plate being driven by the frictional contact of the material being ground between the confronting faces of the plates, means for varying the spacing between the plates to regulate the fineness of the grinding action, and means for preventing overheating of the mill, comprising a cooling medium circulation system therefor.

6. A grinding mill, including a positively driven rotary driving plate, a driven plate having a mounting eccentric to its own axis and in which the mounting therefor is eccentric to the axis of the driving plate, said driven plate being driven by the frictional contact of the material being ground between the confronting faces of the plates, means for varying the spacing between the plates to regulate the fineness of the grinding action, and means for tensioning the plates against relative separation to compensate for accidental feeding of a foreign solid matter therebetween.

7. A grinding mill, including a pair of relatively adjustable driving and driven plates arranged in confronting relation whereby the frictional contact of the material fed between the plates effects the driving of the driven plate from the driving plate, said driving plate being mounted for rotation on a concentric axis, said driven plate being mounted eccentric to its axis of rotation and the axes of said plates being disposed eccentric to each other.

8. A grinding mill, comprising a hollow casing body having a closed end, an open end, and a radial outlet; a closure head for the open end; a driving spindle extending through the closed end; a driving plate concentrically secured to the spindle and arranged within the casing body for rotation by the spindle; a driven plate having a hollow stem arranged eccentrically to the driven plate and extending through the closure head, said stem axis being eccentrically mounted with respect to the spindle and driving plate; and a supply conduit for the material to be ground communicating with the hollow stem of the driven plate to permit of the introduction of the same between the confronting faces of the plates centrally thereof whereby frictional contact of the plate faces effects driving of the driven plate from the driving plate, and a throwing off of the ground material from the peripheries of the plates by centrifugal force.

9. A grinding mill, comprising a hollow casing body having a closed end, an open end, and a radial outlet; a closure head for the open end; a driving spindle extending through the closed end; a driving plate concentrically secured to the spindle and arranged within the casing body for rotation by the spindle; a driven plate having a hollow stem arranged eccentrically to the driven plate and extending through the closure head, said stem axis being eccentrically mounted with respect to the spindle and driving plate; means for effecting axial movement of the spindle for adjusting the plates with respect to each other axially whereby to regulate the degree of fineness or coarseness of the grinding action; and a supply conduit for the material to be ground communicating with the hollow stem of the driven plate to permit of introduction of the same between the confronting faces of the plates centrally thereof whereby frictional contact of the same with said plate faces effects driving of the driven plate from the driving plate, and a throwing off of the ground material from the peripheries of the plates by centrifugal force.

MORTIMER G. ROSS.